United States Patent
Hwang

(10) Patent No.: US 7,203,182 B2
(45) Date of Patent: Apr. 10, 2007

(54) METHOD OF LINK ADAPTATION OF BLIND TYPE USING ACKNOWLEDGEMENTS IN ARQ SYSTEM

(75) Inventor: Seung-Hoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 906 days.

(21) Appl. No.: 09/988,062

(22) Filed: Nov. 16, 2001

(65) Prior Publication Data

US 2002/0060997 A1 May 23, 2002

(30) Foreign Application Priority Data

Nov. 17, 2000 (KR) ............................ 2000-0068286
Feb. 23, 2001 (KR) ............................ 2001-0009110

(51) Int. Cl.
*H04Q 7/24* (2006.01)
(52) U.S. Cl. ........................ 370/338; 370/394; 714/748
(58) Field of Classification Search ..................... None
See application file for complete search history.

(56) References Cited

U.S. PATENT DOCUMENTS

| 5,490,168 | A | | 2/1996 | Phillips et al. ............... 375/224 |
| 5,722,051 | A | * | 2/1998 | Agrawal et al. ............... 455/69 |
| 5,729,557 | A | * | 3/1998 | Gardner et al. ............. 714/774 |
| 5,828,677 | A | * | 10/1998 | Sayeed et al. ............... 714/774 |
| 6,069,883 | A | | 5/2000 | Ejzak et al. ................. 370/335 |
| 6,249,894 | B1 | * | 6/2001 | Lin et al. ..................... 714/748 |
| 6,658,005 | B2 | * | 12/2003 | Seidel et al. ................. 370/394 |
| 6,898,417 | B1 | * | 5/2005 | Moulsley ...................... 455/69 |
| 2001/0034209 | A1 | * | 10/2001 | Tong et al. .................... 455/69 |

FOREIGN PATENT DOCUMENTS

| CN | 1130452 | 9/1996 |
| EP | 0 797 327 A2 | 9/1997 |
| JP | 2000-151504 | 5/2000 |
| WO | WO 98/19414 | 5/1998 |
| WO | WO 00/19634 | 4/2000 |
| WO | WO 02/17548 A1 | 2/2002 |

OTHER PUBLICATIONS

Pursley et al., Variable-Rate Hybrid ARQ for Meteor-Burst Communications, IEEE 1992 vol. 40 No. 1 pp. 60-73.*

* cited by examiner

*Primary Examiner*—Bob A. Phunkulh
(74) *Attorney, Agent, or Firm*—Ked & Associates, LLP

(57) ABSTRACT

Disclosed is a method of link adaptation of a blind type using power offset and multi-codes transmission etc. through acknowledgements (ACK/NAK) in an ARQ System having a Hybrid type as a link adaptation method which can be applied in the ARQ having the Hybrid type in a wireless channel. The method of controlling an adaptation link of a blind type using power offset in an ARQ system having a Hybrid manner, the method includes the steps of transmitting data by an initial coding rate and/or an initial transmission power value to the receiving party; receiving a retransmission (NAK) request signal from the receiving party; and performing the data retransmission by increasing the transmission power and/or the number of multi-codes according to the retransmission (NAK) request.

10 Claims, 3 Drawing Sheets

METHOD OF LINK ADAPTATION OF BLIND TYPE USING ACKNOWLEDGEMENTS IN ARQ SYSTEM

BACKGROUND OF THE INVENTION

1. Field of the Invention

The present invention relates to a link adaptation method in an Automatic Repeat request (ARQ) System, and more particularly to a method of a link adaptation of a blind type using power offset and multi-codes transmission etc. through acknowledgements (ACK/NAK) sent to a transmitting party based on the result of the quality judgment of a receiving signal in a receiving party.

The present invention relates, still more particularly, to a method of the link adaptation to improve a system performance in a transmitter by gradually controlling the number of multi-codes transmission and transmission power with a fixed type power offset and multi-codes transmission according to the retransmission request transmitted, without additional control signals or control channels at a uplink that has been established between a receiver and a base station, when a signal (NAK response) required for packet retransmission from the receiver to a transmitter exists in the ARQ system including a Hybrid type.

2. Description of the Related Art

First of all, the necessity and a related method for controlling power adopted in a Code Division Multiple Access (hereinafter referred to as CDMA) system will be described as a link adaptation method.

In the CDMA system, if necessary, more than two multi-codes can be assigned to a user. This is intended to realize the higher transmission ratio of data than in a case where only one code is used. In the future, a requested data rate will likely be up to 10 Mbps in downlink and up to 20 multi-codes will be available in the art. But, if the same data is transmitted to the multi-codes assigned as the purpose, an effect of controlling transmission power can be obtained.

Closed and fast power control is the most important factor in the CDMA system, because if the closed and fast power control is not properly performed, an over-powered mobile station can interfere the communication within the entire cell.

The power control is to adjust the transmitting power of a mobile station and a base station in order to maintain the system performance even with the lowest transmitted power level.

There are two kinds of power control: a forward link power control and a reverse link power control.

The forward link power control controls the transmitting power of the base station in order to reduce the interference to adjacent cells.

Meanwhile, the reverse link power control controls the transmitting power of the mobile station in order to resolve Near-Far Interference Problems, which is resulted as all of the mobile stations in a cell use the same frequency range.

Generally speaking, when considering a path loss resulted from a wireless link between the base station and the mobile station in mobile communication environment, it is known that the amplitude of radio wave that is influenced by the distance is diminished. Accordingly, if the power of the mobile station were constant, the receiving power from the mobile station located far away from the base station would be small compare to the mobile station located adjacent to the base station.

Because of the capacity in the CDMA system is maximized when the receiving power of each mobile station is the same, the CDMA capacity can be seriously diminished in the above situation. That is to say, it is impossible for a base station to demodulate a signal from a mobile station far away from the base station regardless of despreading, because it has smaller signals than the interference caused by an adjacent mobile station.

This is generally called as 'Near and Far Problem'. In order to overcome the 'Near and Far Problem', the transmitting power of the mobile station should be adjusted such that the receiving power of each mobile station in a base station may be constant. That is to say, the mobile station adjacent to the base station should transmit the signal in a lower transmitting power, and the mobile station far away from the base station should send out the signal in a higher transmitting power. This is called 'power control', and very accurate and elaborate power control system is needed for the CDMA system.

Accordingly, the best idea in light of the maximum capacity is that the bit power received from all the mobile stations should be constant.

In addition to 'Near and Far Problem' that shows the big difference in signal power received by the base station as a result of the distance between the mobile stations and the base station, there is fading in each mobile station. Therefore, in order to overcome this environmental obstacle and maximize the capacity for subscribers, an elaborate power control with a broadly operating dynamic range is required for a reverse link.

In order to maximize the capacity of the CDMA system, the signal of each mobile station should be received with a minimum Signal to Interference Ratio (SIR) in the base station. If the transmitting power of the mobile station is low, traffic quality becomes low, while if the transmitting power of the mobile station is high, the traffic quality becomes high. But other mobile stations will be effected with much interference in the same channel and the traffic quality of other subscribers will be deteriorated. Accordingly, in order for all of the subscribers to maintain a good traffic quality and maximize the capacity, the transmitting power of each mobile station received at the base station should be the same and its value should be the minimum Signal to Interference Ratio by controlling the transmitting power of each mobile station.

As described above, the power control can be described with the forward link power control and the reverse link power control.

There are an open loop power control and a closed power control in the reverse link power control.

In a mobile station, it is really difficult to predict the exact path loss of reverse channel because of the fading characteristics from a different frequency range and mismatch between a receiver and a transmitter, and the difference between the forward channel and the reverse one. In order to correct this error, each mobile station needs to control outputs by the power control command in a low speed from the base station through the forward channel.

The base station acquires error correction information by monitoring the state of the reverse channel and comparing with a preset value, and gives a command to the mobile station for either to increase or to decrease the outputs based on the comparison results. With such method, the base station can simultaneously meet an appropriate traffic quality and capacity maximization by controlling the power of the reverse channel of every mobile station.

Meanwhile, there are an open loop power control and a closed loop power control in the forward link power control.

If the forward link is defective, the traffic quality doesn't reduce to below the standard level when the transmitting power of the base station increases. For example, if the mobile station is in an area where there is a similarity in the path loss for both the current calling base station and the adjacent base station in a cell boundary area having two or three cells folded, (or an area where there is serious path loss due to fading and source of strong interference, etc), this mobile station needs to increase the transmitting power of the base station for the deteriorated traffic quality resulted from the interference by other adjacent base stations.

In contrast, in case that the mobile station is near the base station and Signal to Interference Ratio is in a good state, the interference to other mobile stations can be diminished by reducing the transmitting output of the base station so as not to seriously affect the traffic quality for the traffic channel.

1. Reverse Link Open Loop Power Control

Each mobile station measures the total received power of all CDMA channels in a specific base station. Since the entire power is monitored without demodulated signals, it is rather easy to predict the power without any information about synchronization time, the name of the base station, and the path loss.

The mobile station transmits the average outputs calculated by an initial searching. L the following procedure of an access search, the output is increased up to the level of the time when the corresponding response exists. After initializing the reverse traffic channel with the average transmitting output of an initial reverse traffic channel going through this process, if the output control bit is received from the mobile station, the power control mode is switched into the closed loop power control.

2. Reverse Link Closed Power Control

In the power control procedure, an Eb/No prediction value is measured at the base station with a period of fixed time interval, and compared with a preset limit Eb/No value, and transmitted a corresponding command to the mobile station every interval.

Here, the variation quantity of average output is 1 dB per power control bit. The mobile station controls the power of the closed loop within the range of greater than 24 dB ± of the open loop measurement value; an upper limited value is determined by a maximum output.

3. Forward Link Open Loop Power Control

In the forward link open loop power control procedure, the base station forecasts the forward link loss based on the received power of the mobile station, controls the initial digital gain of each traffic channel with the forecasted value, and allocates a standard gain for each channel at the initial stage.

4. Forward Link Closed Loop Power Control

In the forward link closed loop power control, the mobile station measures the quality of forward traffic channel frame and reports to the base station periodically, so that the base station can compare the value with a preset value, and adjusts the output of the forward traffic channel accordingly. And the mobile station automatically reports the value to the base station in case where the number of defective frame exceeds the preset standard value, and the base station raises the outputs allocated to each channel. Also, all of the mobile stations maintain the traffic quality of the forward traffic channel through this procedure, and the base station has an additional function in order to not to reach the saturation state of a power amplification.

In the CDMA system, a major power control method is the closed loop power control as described above.

FIG. 1 shows the closed loop power control in the CDMA. When a mobile station MS1 and anther mobile station MS2 operate with different spreading codes at the same frequency, the mobile station MS1 which located near the outer boundary of a cell experiences the path loss of about 70 dB lower than that of the mobile station MS2 located adjacent to a base station BS. If the mechanism of the base station BS that controls the power at the same level doesn't exist for the far away mobile station MS1 and the near by mobile station MS2, the mobile station MS2 located near by the base station BS blocks many parts of a cell by maintaining larger power than that of the mobile station MS1 located near the outer boundary of a cell and far away from the base station. As previously described, this problem is known as 'Near and Far Problem'.

The Near and Far Problem is one of chronic problems in the CDMA system in which the channel capacity of the system being basically determined by the interference, because of the channel capacity is affected by the wave characteristic of an electromagnetic wave.

As shown in FIG. 1, the base station BS frequently measures Signal to inference Ration (SIR) and compares with a target SIR in the closed loop power control of uplink 101. If the measured SIR is higher than the target SIR, the base station sends out commands prescribing that the mobile station should lower the power. But, if the measured SIR is much lower, the base station sends out commands that the mobile station should increase the power. A series of procedures including measurement, command, and response, are performed 1500 times (1.5 kHz) per second for each mobile station and the speed gets faster than the change of path loss which sometimes occurs, and even faster than Rayleigh fading at a lower or middle moving speed. Therefore, the power unevenness among all the uplink signals received from the base station can be resolved.

In the same manner, the closed loop power control can be operated in the downlink 102 as described above. Since 1:n(n≧2) communication is performed in the downlink, the 'Near and Far problem' doesn't occur. All the signals in a cell are transmitted from the base station to all of the mobile stations, therefore, it is desirable to provide a minimum additional power to the mobile station located adjacent to the boundary line. The reason is that other cell interference can be increased. Also, it is required to intensify a weakened signal of low speed due to Rayleigh fading in the downlink because interleaving and an error correction code method does not work effectively.

As described above, the fast closed loop power control is called 'inner loop power control' and it is an essential operation due to uplink Near and Far Problem in the CDMA system. The fast closed loop power control operates at the uplink and the downlink at the speed of 1500 Hz based on a command per a slot.

For reference, GSM supports slow power control (2 Hz), and IS95 supports 800 HZ power control only in the uplink. The basic step size of power control is 1 dB. Additional plural step size can be used and much smaller step size can be performed after modification. Small step size means that 1 dB is operated at every two slots, so that it has the same effect as that of 0.5 dB operation. Actually, the operation below 1 dB results in complexity problem. The gain is greater in slower moving speed than it is in fast moving speed, request Eb/No rather than the transmission power and the case there are only a few usable multi-paths such as ITU Pedestrian A channel.

Meanwhile, as described above, there is the open loop power control method as the power control method in view of Near and Far Problem and the maximum acceptance capacity, and the method is not really precise one since it roughly estimates the path loss by using the downlink bit control signal.

The reason is that the fast fading has no correlation between the uplink and the downlink due to separation of a frequency band. However, the open loop power control is used when the initial power setting for the mobile station is roughly set at the time when a call is established.

The open loop control is performed before RACH or CPCH transmission is initialized. However, the adjustment is not accurate, because it is difficult to measure the large variation of the power in the mobile station. The requirement for accuracy is within ±9 dB.

FIG. 2 is a view showing the outer loop power control. The outer loop power control targets the request of individual wireless link in the base station BS and the quality of a preset level defined as BER and FER, and makes correction for the target SIR. An optimum plan is to operate the target SIR value near the minimum value to meet the request target quality.

FIG. 3 is a view showing a procedure of the general outer loop power control. The target SIR can be decreased or increased depending on the comparison result after comparing the received quality with the target quality.

The outer loop power control is required to maintain communication quality required level by setting the target value of fast power control (target SIR).

The outer loop power control is required for the both uplink and the downlink because the fast power control is performed at both links.

For reference, in IS-95 system, the outer loop power control is used only in the uplink because there is no fast power control in the downlink. The fast power control frequency is 1.5 kHz and the outer loop power control frequency is 10~100 Hz. The down link outer loop power control based on a network increases signaling load between the mobile station and the radio network controller (RNC) and results in the time delay. Accordingly, the outer loop power control based on the mobile station is used in the WCDMA.

The related fast closed loop power control can produce rather poor performance than slow open loop power control because of SIR assumption error, the power control signaling error and the power control loop time delay. Especially, in order to maximize the acceptance capacity of downlink which should support high data rate in the CDMA, the transmission power control required for each link should be performed. However, in some cases, it is difficult to perform the additional power control, thus another type of power control is preferred than the direct transmission power control.

SUMMARY OF THE INVENTION

It is, therefore, an object of the present invention to provide a method of a link adaptation of a blind type using power offset and multi-codes transmission etc. through acklowledgements (ACK/NAK) in an ARQ System including a Hybrid type as a link adaptation method, which can be applied in the ARQ including the Hybrid type in a wireless channel.

To achieve the above object, there is provided a method of controlling an wireless communication link in a transmitter of an wireless communication system automatically requiring a retransmission from a receiving party to a transmitting party, the method comprising the steps of transmitting data by an initial coding rate and/or an initial transmission power value or number of multi-codes to the receiving party; receiving a retransmission request signal (NAK) from the receiving party; and performing the data retransmission by increasing the transmission power or the number of multi-codes according to the retransmission request.

If a response (ACK) signal is received according to the result of quality judgment for the receive signal, the transmission power or the number of multi-codes are initialized.

If the decrease of the coding rate for the retransmission is reached to a source coding rate, the retransmission is started from the highest coding rate, as the number of multi-codes is initialized or continuously increased.

If the decrease of the coding rate for the retransmission is leached to a source coding rate, the retransmission is started from the lowest coding rate, as the number of multi-codes is either maintained or continuously increased.

If the data retransmission step is performed by maintaining the initial coding rate and increasing the power offset and the number of multi-codes according to the retransmission (NAK) request.

BRIEF DESCRIPTION OF THE DRAWINGS

The above objects, features and advantages of the present invention will become more apparent from the following detailed description when taken in conjunction with the accompanying views, in which.

DETAILED DESCRIPTION OF THE PREFERRED EMBODIMENT

Figure 1:
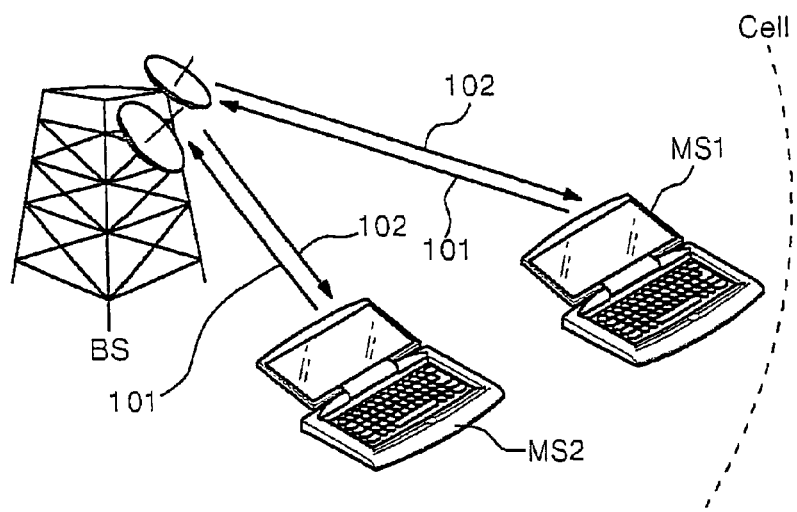
FIG. 1 is a view illustrating a closed loop power control method in a CDMA system.
Figure 2:
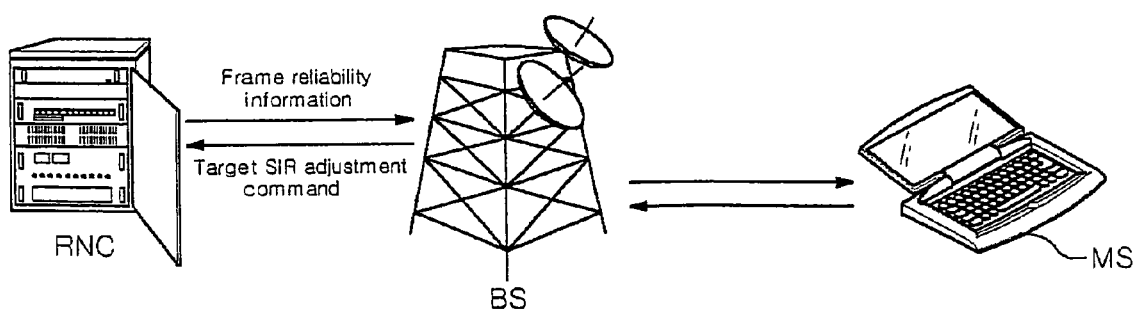
FIG. 2 is a view illustrating an outer loop power control method in a CDMA system.
Figure 3:
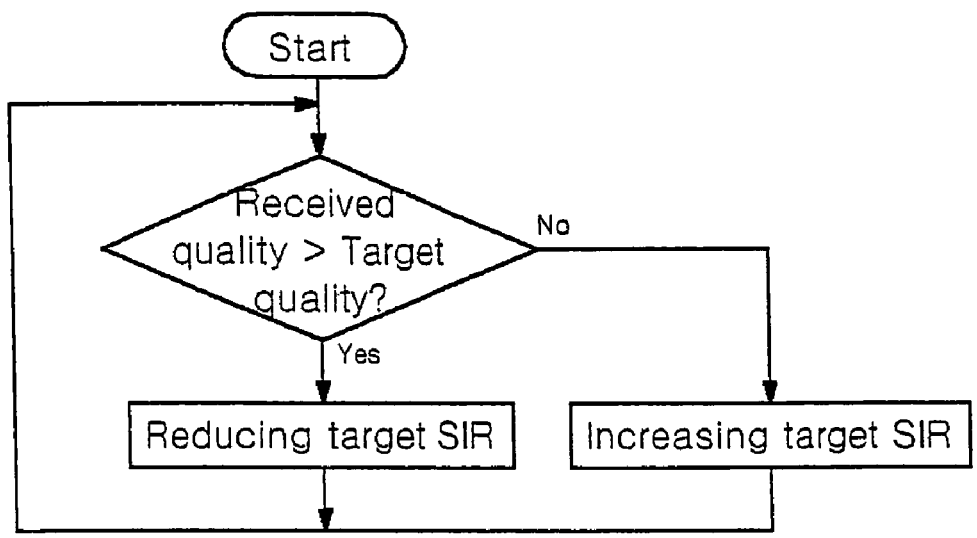
FIG. 3 is a view illustrating a procedure for a general outer loop power control method.
Figure 4:
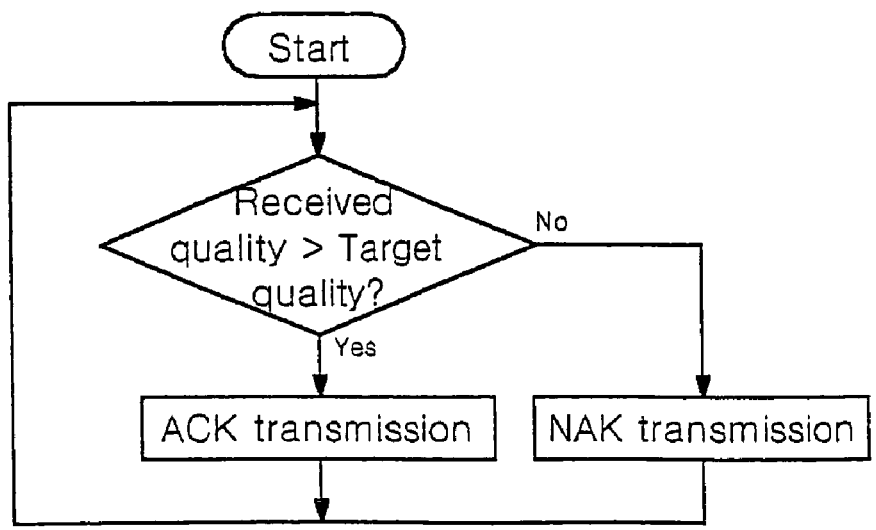
FIG. 4 is a view illustrating a control procedure of a receiving party for link adaptation combined with an ARQ having a Hybrid type.

A preferred embodiment of the present invention will now be described with reference to the accompanying views. In the following description, same view reference numerals are used for the same elements even in different views. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The following description will be the embodiments, the purpose and features, and a method of controlling a link adaptation power using an adaptive multi-codes transmission and power offset, which are adaptively varied in an ARQ system according to the present invention with reference to attached drawings.

First of all, an ARQ system having the Hybrid type applicable to the link adaptive power offset and the multi-codes transmission of the present invention will be explained.

The Hybrid ARQ is a system intended for improving the system reliability and the system performance by combining a general ARQ method for detecting an error when an error is occurred in a received signal and for requesting of retransmission for the signal to a transmitting party and an error correction channel encoding method for overcoming degradation of the channel.

The encoding rate of channel code transmitted from the Hybrid ARQ system is reduced to increase the reliability of the signal in proportion to the repeat times of retransmission by being punctured at a source coding rate. The Hybrid ARQ method operated adaptively according to channel environment is essential to serve a multimedia service.

The Hybrid ARQ method is based on the adaptive error correction method, the number of surplus bit to protect data bit from channel degradation increases gradually during retransmission. According to adopted ARQ method, 'stop and wait', 'go back N', and 'selective repeat' protocol method can be adapted, and the data packet of length L includes n information bit, np parity bit, and a tail bit having m pieces of '0'.

At this time, the data packet is indicated as c0 and the source-coding rate is indicated as 1/h. The coding bit is punctured periodically according to an optimum puncturing pattern, and as a result, the Rate Compatible Punctured (RCP) code can be acquired. If the coding rate of RCP code is Rk, k≧1 and Rk≧Rk+1. An incremental code word expressed in Ck has the code bit included in the code word of Rk encoding rate, not the code word of high encoding rate. The incremental code word is interleaved and transmitted through a channel.

In the Hybrid ARQ system, the signal transmission starts at the high encoding rate (for example, R1=1) in the beginning stage. The received signal is decoded in the mobile station and if the decoded signal has an error, the retransmission is requested. (That is to say, NAK response is performed).

The transmitting party receives the retransmission NAK response and transmits the incremental code word at a lower encoding rate than the earlier transmitted encoding rate. If the transmission fails regardless of the source encoding rate support, the transmission can be performed from the beginning stage again. At this time, the transmission can be performed at lower encoding rate than 1/h.

Generally speaking, the channel encoding method can be adopted using convolutional encoding or turbo encoding, and the code is referred as Rate Compatible Punctured Code, RCP Code, or Complementary Punctured Code. In the CP Code, a code type is classified as Type II or Type III. Generally speaking, the retransmission of a signal having the same transmission signal is defined as Type I.

The related fast closed loop power control can have a poorer performance than the slow open loop power control due to the SIR assumption error, the power control signaling error, and the power control loop time delay.

Meanwhile, if the Hybrid ARQ method is adopted, the efficient method of the link adaptation control with a higher reliability is required. Especially, in order to maximize the acceptance capacity of downlink that supports the high data rate in the CDMA system, the link adaptation control for the multi-codes transmission and the transmission power required for each link should be performed.

Accordingly, the present invention is to suggest the link adaptation control method of superior performance by combining die link adaptation method of the blind type and the ARQ having the Hybrid type proposed for the multimedia service.

The power control in the CDMA system is an essential link adaptation method which can increase the reliability of signal transmission. However, the power control should match the channel environment and be dull in errors such as the time delay of the power control loop, the error of the power control signal and the SIR assumption.

Accordingly, the link adaptation control due to the adaptive power offset and the multi-codes transmission can be used for compensating these defects in a deteriorated channel environment. The power control method adopted in a related system generally performs the channel prediction, but the method of the present invention is a blind method which doesn't require any information for the channel environment by combining the ARQ method having the Hybrid type and the adaptive power offset and the multi-codes transmission.

Figure 5:
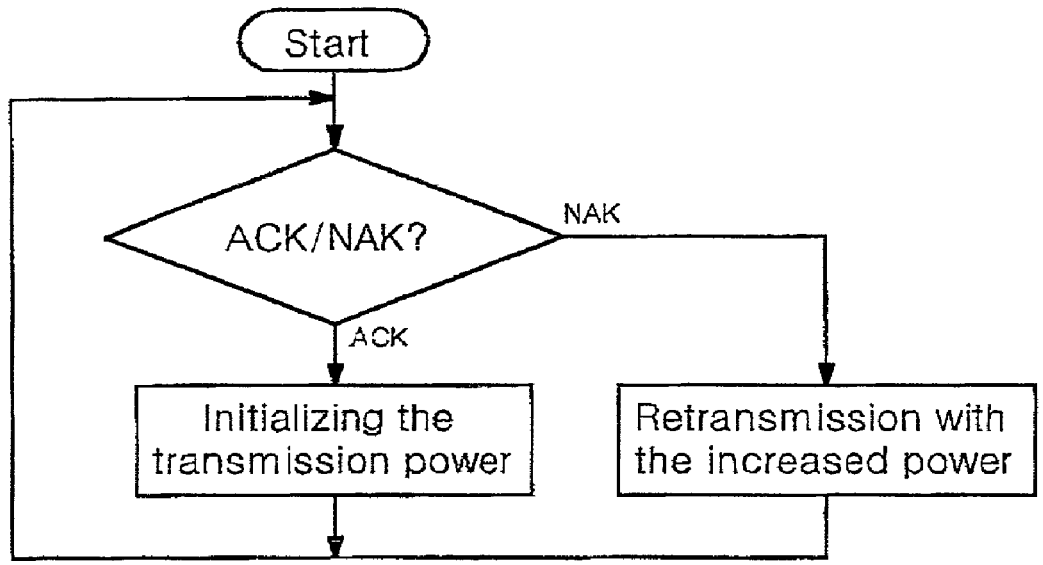
FIG. 5 is a view illustrating a procedure for power control in a transmitting party for link adaptation combined with an ARQ having a Hybrid type.
Figure 6:
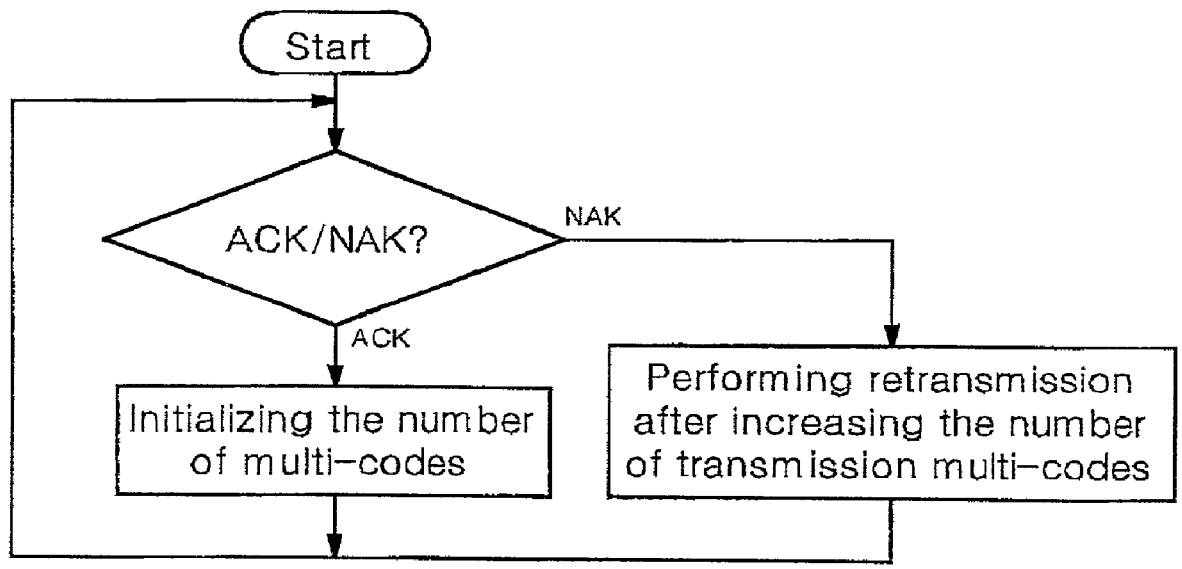
FIG. 6 is a view illustrating a procedure for the control of multi-code number in a transmitting party for link adaptation combined with an ARQ having a Hybrid type.

FIG. 5 and FIG. 6 show the link control procedure of the adaptive power offset and the multi-codes transmission at a receiving party and a transmitting party according to the present invention.

In the ARQ system having the Hybrid type, the data of a block enters a CRC encoder and passes a puncturing code encoder. Therefore, an incremental code word is generated. The code word selected for transmission is interleaved and forms the channel block of Lc length, after the channel block is modulated and transmitted to fading channel. The selection of the encoding rate and the signal power offset and the number of the multi-codes transmission at the time of each transmission depends on feedback signals (ACK/NAK). The receiver consists of a decoder and CRC decoder, and appropriate feedback signals (ACK/NAK) are determined according to the comparison result of the received quality and the target quality.

First, the data transmission from the transmitting party to receiving party starts from the numbers of the highest encoding rate and the lowest power offset and number of transmission codes. The receiving party determines the quality of information received, and the retransmission by the transmitting party is required when the received quality is below than the target quality.

When the retransmission request occurs due to an error and arrives at the transmitting party, the transmitting party reduces the encoding rate in a fixed pattern and increases the power offset and the number of transmission multi-codes, simultaneously.

Moreover, when the retransmission is required, the target power value of the signal gradually increases during the time of retransmission, and the link control based on the outer loop power control is achieved as described above.

Meanwhile, when increasing the power offset and the number of transmission multi-codes, the control step is to be fixed, the power offset and the number of transmission multi-codes are increased or the power offset and the number of transmission multi-codes can be increased flexibly with such fixed step.

However, if the received quality satisfies the target quality, the receiving party generates appropriate response (ACK) signals and transmits to the transmitting party. The transmitting party initializes the power offset and the number of transmission multi-codes when the response (ACK) signal is received and the process is newly started.

Also, according to the retransmission (NAK) require, if the source encoding rate is supported by performing the retransmission, while gradually reducing the encoding rate (that is to say, increasing the power offset and the number of transmission code), the retransmission can start again at the highest encoding rate or retransmission can continue at the lowest encoding rate. In the former case, the power offset and the number of transmission multi-encodes can be continuously increased in the fixed or the flexible step with or without the initialization. In the latter case, the power offset and the retransmission can be continued in the lowest encoding rate while the number of multi-codes remains the same or continues to increase in a fixed or flexible step.

As described above, the present invention has a basic technological idea in that the proposed system reduces the encoding rate of the Hybrid ARQ at the time of retransmission, while the power offset and the numbers of transmission multi-codes are increased, simultaneously.

That is to say, according to the present invention, when the retransmission probability is high, the power offset and the number of transmission multi-codes gradually increases according to the retransmission times. Since, the process is performed in a situation in which there is no information about the channel at the transmitter, problems such as the overburden of the control signal in the uplink, which is a normal problem in the ARQ system having the Hybrid type, or time delay due to control signal process, can be resolved. The present invention provides better system when compare to the related ARQ system in terms of workload and efficiency Also, the generation of the power control signal for the link adaptation is available in a condition in which the channel information is assumed to be usable by the transmitting party, although the present invention is the link adaptation of the adaptive power offset and the multi-codes transmission method operating in the blind method without using information for the channel situation. The adaptive determination of corresponding parameters depends on the retransmission requirement, and the initial transmission for the given packet is selected at the lowest power offset and the number of transmission multi-codes. The power offset and number of transmission multi-codes is gradually increased during the retransmission, since the process will be continued until the transmission is successfully achieved.

The power control system for the link adaptation in the CDMA system reduces the acceptance capacity due to the increase of interference when the power offset and the number of transmission multi-codes is increased. While accepting of the reduction, the reliability for the increase signal can be enhanced. The adaptive link control method of the present invention can be adopted at International Mobile Telecommunication (IMT)-2000 system for serving the multimedia service, and the adaptive modulation and coding and an adaptive ARQ can be considered.

While the invention has been shown and described with reference to certain preferred embodiments thereof, it will be understood by those skilled in the art that various changes in form and details may be made therein without departing from the spirit and scope of the invention as defined by the appended claims.

The related fast closed loop power control can show more deteriorated performance than the open loop power control which is slow because of the SIR assumption error, the power control signaling error, and the power control loop time delay.

The present invention can reduce the errors and the delay as mentioned and the performance increase can be expected because the adoptive power offset and the multi-codes transmission of the blind type and the ARQ having the Hybrid type proposed for the multimedia service are combined together.

Also, the channel adaptation of the ARQ is intensified much more by controlling the power offset and the multi-code transmission, and the performance can be much increased. Also, the channel prediction is not required by overcoming the disadvantage of the general power control, the control signal burden of the uplink is diminished, and the process time delay can be greatly reduced when the ARQ system is processed the Media Access Control (MAC) of Node B.

What is claimed is:

1. A method of controlling a wireless communication link in a transmitter of a wireless communication system that automatically requires by a receiving party a second transmission from a transmitting party to the receiving party, the method comprising:
   transmitting data from the transmitter at the transmitting party using at least one of an initial coding rate or an initial transmission power value to the receiving party;
   receiving a second transmission request signal from the receiving party; and
   performing the second transmission from the transmitter at the transmitting party by decreasing the initial coding rate and increasing the transmission power according to the second transmission request, and without requiring channel environment information of the wireless communication link,
   wherein the decrease of the initial coding or the increase of the transmission power is performed in a fixed or flexible pattern.

2. The method as claimed in claim 1, wherein the transmission power is returned to an initialized value, if a response signal is received from the receiving party after performing the second transmission.

3. The method as claimed in claim 1, wherein if the decrease of the coding rate for the second transmission reaches a lowest coding rate, the second transmission is continuously performed at the lowest coding rate, while the transmission power is continuously increased.

4. The method as claimed in claim 1, wherein a target power value is gradually increased while the second transmission is performed according to the second transmission request, and the transmission power is continuously increased.

5. The method as claimed in claim 1, wherein the second transmission is performed by maintaining the initial coding rate and increasing the transmission power according to the second transmission request.

6. The method as claimed in claim 1, wherein the decrease of the initial coding rate or the increase of the transmission power is performed in a predetermined pattern.

7. A method of controlling a wireless communication link in a transmitter of a wireless communication system that automatically requires by a receiving party a second transmission from a transmitting party to the receiving party, the method comprising:
   transmitting data from the transmitter at the transmitting party using at least one of an initial coding rate or an initial transmission power value to the receiving party;
   receiving a second transmission request signal from the receiving party; and performing the second transmission from the transmitter at the transmitting party by decreasing the initial coding rate and increasing a number of multi-codes according to the second transmission request, wherein channel environment information of the wireless communication link is not required at the transmitter for the performing the second transmission.

8. The method as claimed in claim 7, wherein the number of multi-codes is returned to an initialized value, if a response signal is received from the receiving party after performing the second transmission.

9. The method as claimed in claim 7, wherein if the decrease of the coding rate for the second transmission reaches to a lowest coding rate, the second transmission is continuously performed at the lowest coding rate, as the number of multi-codes is continuously increased.

10. The method as claimed in claim 7, wherein the second transmission is performed by maintaining the initial coding rate and increasing the number of multi-codes according to the second transmission request.

* * * * *